No. 729,948. PATENTED JUNE 2, 1903.
A. L. LEWIS.
RANGE FINDER FOR PHOTOGRAPHIC CAMERAS.
APPLICATION FILED MAR. 28, 1903.
NO MODEL.
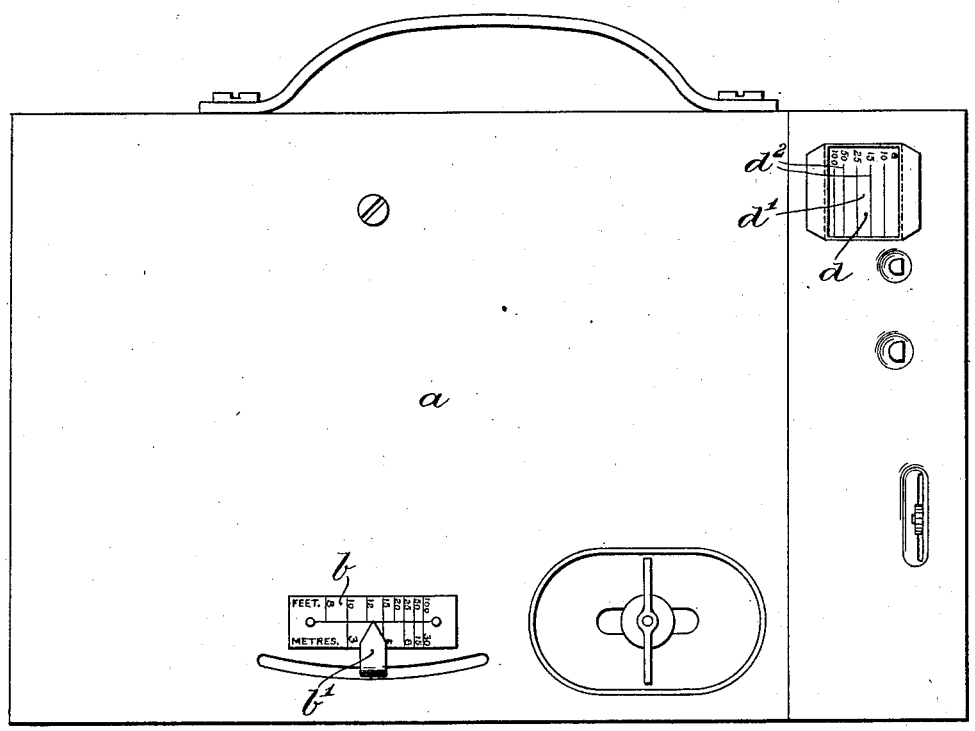
Fig. 1.
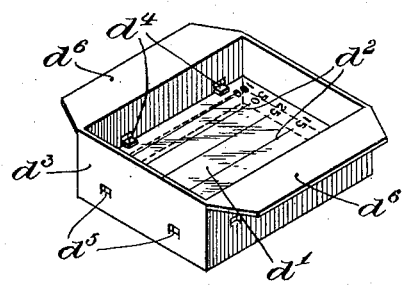
Fig. 2.
Fig. 3. Fig. 4.
Witnesses:
Jas. C. Wobensmith
Wilhelm Vogt
Inventor:
Atwood L. Lewis,
By J. Walter Douglas.
Attorney No. 729,948. Patented June 2, 1903.

UNITED STATES PATENT OFFICE.

ATWOOD LLOYD LEWIS, OF PHILADELPHIA, PENNSYLVANIA.

RANGE-FINDER FOR PHOTOGRAPHIC CAMERAS.

SPECIFICATION forming part of Letters Patent No. 729,948, dated June 2, 1903.

Application filed March 28, 1903. Serial No. 149,928. (No model.)

*To all whom it may concern:*

Be it known that I, ATWOOD LLOYD LEWIS, a citizen of the United States, residing at the city of Philadelphia, in the county of Philadelphia and State of Pennsylvania, have invented certain new and useful Improvements in Range-Finders for Photographic Cameras, of which the following is a specification.

My invention has relation to a range-finder for photographic cameras, and in such connection it relates to the construction and arrangement of such a finder whereby the distance from the camera of an object of predetermined height may be measured directly upon the image-plate of the finder and the measurement thereafter transferred to the focusing-gage.

The principal object of my invention is to provide in a photographic camera having a variable focus a finder having applied to the ground-glass or image plate of the finder a scale so graduated that the distance from the camera of an object of predetermined height will be indicated in the finder and the measurement so obtained can be readily transferred to the focus-finding scale.

The nature and scope of my invention will be more fully understood from the following description, taken in connection with the accompanying drawings, forming part hereof, in which—

Figure 1 is a side elevational view of a photographic camera of a well-known type having a focus-finding scale and a range-finder embodying main features of my invention. Fig. 2 is a perspective view, enlarged, of the graduated plate to be applied to the range-finder. Fig. 3 is a cross-sectional view of Fig. 2; and Fig. 4 is a sectional view of the finder, taken at right angles to the section illustrated in Fig. 3.

Referring to the drawings, $a$ represents a camera of any well-known type, the camera illustrated being known in the trade as a "No. 4 bull's-eye kodak." The camera $a$ has mechanism (not shown) for varying the focus, which variation is indicated upon a scale $b$ by means of a shifting pointer $b'$, attached to the mechanism.

Into the opening of the finder $d$ is fitted a plate $d'$, of transparent or translucent material, having a scale $d^2$, graduated as hereinafter described. The plate $d'$ is fitted, preferably, as shown, in a box $d^3$, of metal, being supported therein by offsets or prongs $d^4$ and $d^5$, projecting from the side and end walls, respectively, of the box $d^3$. The box $d^3$ has two flaps $d^6$, by means of which the box may be readily inserted in or withdrawn from the opening of the finder $d$.

The measurements or scale $d^2$ upon the plate $d'$ are found as follows: An object of predetermined height—say six feet—when viewed from a distance of ten feet away will project upon the image-plate of the finder an image extending from that margin of the plate $d'$ which is below the "100" mark upward to the mark numbered "10" on the scale. When the same object is fifteen, twenty-five, fifty, or one hundred feet from the camera, its image will extend on the scale from said margin upward to the "15," "25," "50," or "100" mark, as the case may be. When the scale $d^2$ has been once determined, as above set forth, all that is necessary to find the distance of any other objects from the camera and to focus for that distance is to select in the picture to be photographed an object which is known to be six feet high or of approximately that height and ascertain from the image of that particular object upon the scale $d^2$ of the plate $d'$ the distance of the object away from the camera. This measurement can then be used to set the focus of the camera by moving the pointer $b'$ over the focusing-scale $b$ to the corresponding distance-mark.

It should be understood that where the plate $d'$ is carried by a box $d^3$ said box $d^3$ may vary in shape and form, so as to fit varying shapes and forms of finder-openings used in the various types of cameras in which the focus is variable. The scale $d^2$, while preferably used for an object of predetermined height, may likewise be used for objects of multiple the height or of fractional height of the original object. Thus if the scale $d^2$ was formed for the measurement of an object six feet high it could be used for objects three feet high or twelve feet high by simply in the first instance doubling the length of the image upon the scale $d^2$ or in the second instance halving the length of said image.

Having thus described the nature and object of my invention, what I claim as new, and desire to secure by Letters Patent, is—

1. In a camera having a variable focus and provided with focusing mechanism and a scale therefor, a finder having upon its image-plate a scale, the measurements whereof are graduated so as to indicate the distance of an object of predetermined height away from the camera.

2. In a camera of the variable-focus type and provided with a focusing mechanism, a scale therefor and a finder, a scale-plate arranged to fit the opening above the image-plate of the finder and a scale formed on said scale-plate and having its measurements graduated to indicate the distance from the camera of an object of predetermined height.

3. An attachment for the finder of a photographic camera having a variable focus, comprising a box adapted to fit in the opening of the finder, a plate secured within said box and a scale arranged on said plate and graduated so as to indicate the distance away from the camera of an object of predetermined height.

In testimony whereof I have hereunto set my signature in the presence of two subscribing witnesses.

ATWOOD LLOYD LEWIS.

Witnesses:
J. WALTER DOUGLASS,
THOMAS M. SMITH.